(No Model.)
C. SPRAKE.
ICE VELOCIPEDE.
No. 398,465. Patented Feb. 26, 1889.
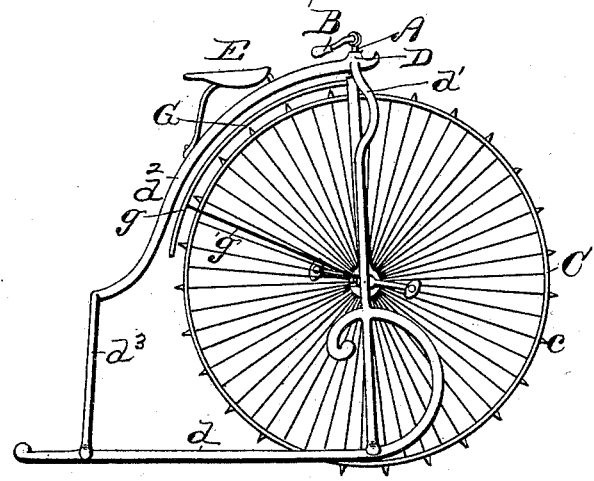
Fig. 1.
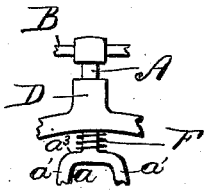
Fig. 3.
Fig. 2.
WITNESSES
Samuel E. Thomas
M. B. O'Dogherty
INVENTOR,
Charles Sprake
By W. W. Pepper & Co.
Attorneys

UNITED STATES PATENT OFFICE.

CHARLES SPRAKE, OF DETROIT, MICHIGAN.

ICE-VELOCIPEDE.

SPECIFICATION forming part of Letters Patent No. 398,465, dated February 26, 1889.

Application filed November 15, 1888. Serial No. 290,904. (No model.)

*To all whom it may concern:*

Be it known that I, CHARLES SPRAKE, a citizen of the United States, residing at Detroit, county of Wayne, State of Michigan, have invented a certain new and useful Improvement in Velocipede-Sleighs; and I declare the following to be a full, clear, and exact description of the invention, such as will enable others skilled in the art to which it pertains to make and use the same, reference being had to the accompanying drawings, which form a part of this specification.

My invention has for its object the provision of a vehicle adapted to travel over ice, snow, and the like, that may be propelled by the occupant, and relates more particularly to a vehicle wherein a single drive-wheel revolved by the operator's feet is utilized to propel the vehicle.

I accomplish the object of my invention by the combination and construction of devices hereinafter described and claimed.

In the drawings, Figure 1 is a side elevation of my improved velocipede-sleigh. Fig. 2 is a front elevation, and Fig. 3 a detailed view, of a part.

In the above drawings, A represents a standard to which the handle B is attached. This standard is at $a$ forked, and extends downward on either side of the wheel C. The two shanks $a'$ of the standard have on their lower ends the bearings $a^2$, in which the axle $C'$ of the wheel is journaled. The peripheral surface of the wheel is at intervals provided with spurs $c$, adapted to pierce into or impinge the surface over which the sleigh is being propelled. The axle $C'$ of the wheel has the crank-arms $C^2$ on each end and extending in opposite directions from the axle, and these crank-arms are provided with pedals $C^3$, on which the feet may rest. The construction of the wheel and propelling mechanism is similar to that commonly used in the construction of bicycles.

D is a sleeve which loosely embraces the standard at a point above the wheel. The sleeve D is connected by a frame-work with two parallel runners, $d$, one on each side of the wheel and extending back of the same. The said frame-work consists of the side braces, $d'$, extending from the sleeve down to the forward ends of the runners, and the reach $d^2$, which extends from the sleeve backward and downward to the cross-bar $d^3$, the latter connecting the rear ends of the runners. The loose embracing of the standard by the sleeve will permit the former to have a vertical as well as a rotary motion, thus enabling the operator not only to steer in any desired direction, but allowing the wheel to ride over inequalities of the surface, while the runners, because of their extended bearing, will easily slide over such inequalities. This frame-work may of course be made in separate parts and be united together; but ordinarily I prefer to make it in one piece. So, also, the shape of the frame may be varied without departing from the spirit of my invention.

E is a seat attached to the reach $d^2$.

F is a spring located between the lower end of the sleeve D and the shoulder $a^3$ on the standard A. This spring is adapted to hold the wheel to a firm bearing against the surface, and yet allow it, when necessary, to give slightly, and thus conform to the irregularities of the surface and yet remain in firm contact therewith.

G is a guard extending rearwardly from the shank A, and below and preferably parallel with the reach $d^2$. The lower end, $g$, is connected by braces $g'$ either with the axle-bearings $a^2$ or, if preferred, with the lower ends of the two shanks $a'$. The spurs $c$ may be attached to the wheel in any desired way; but I prefer to screw them into the tire, since they may then be removed and replaced when desired.

The spring F need not necessarily be a spiral spring located as shown, since a leaf-spring engaged at one end to the reach $d^2$ and the other end engaged to the standard would serve the same purpose, and would of course be contemplated by my invention.

What I claim is—

In a velocipede-sleigh, the combination of a standard, a drive-wheel journaled therein, a sleeve loosely embracing said standard above the wheel, suitable frame-work connecting said sleeve with the runners, a guard extending rearwardly from the standard, braces connecting the lower end of said guard with the lower ends of the two shanks $a'$ of the standard, and a spring on the standard below the loose sleeve to keep the drive-wheel to its work and permit it to rise and ride over inequalities in the surface traversed, substantially as described.

In testimony whereof I sign this specification in the presence of two witnesses.

CHARLES SPRAKE.

Witnesses:
M. B. O'DOGHERTY,
W. H. CHAMBERLIN.